United States Patent [19]

Grise

[11] 4,431,228

[45] Feb. 14, 1984

[54] VEHICLE CAP CONSTRUCTION

[75] Inventor: Richard L. Grise, Bristol, Ind.

[73] Assignee: R. & T. Frames, Inc., Elkhart, Ind.

[21] Appl. No.: 209,590

[22] Filed: Nov. 24, 1980

[51] Int. Cl.³ ............................................. B60P 3/42
[52] U.S. Cl. .................................. 296/100; 296/146; 15/250.1; 49/458; 52/207; 98/88 R
[58] Field of Search ............... 296/100, 106, 146, 148, 296/164, 150, 156, 216; 49/406, 458; 52/207; 98/88 R, 88 S; 15/21 B, 103, 250.1

[56] References Cited

U.S. PATENT DOCUMENTS

| | | | |
|---|---|---|---|
| 3,447,830 | 6/1969 | Willison | 296/100 |
| 3,452,384 | 7/1969 | Scinta | 15/250.10 |
| 3,936,077 | 2/1976 | Bliek | 296/100 |
| 3,955,845 | 5/1976 | Werner | 296/10 |
| 4,068,886 | 1/1978 | Gostomski | 296/100 |
| 4,187,642 | 2/1980 | Morinaga et al. | 49/406 |

OTHER PUBLICATIONS

Publication "CK-200 Package", R. & T. Frames, Inc. Elkhart, Ind., 1974.
Publication, "El Rancho-Quality Custom Figerglass Caps", El Rancho, Elkhart, Ind.

*Primary Examiner*—Richard A. Bertsch
*Attorney, Agent, or Firm*—Price, Heneveld, Huizenga & Cooper

[57] ABSTRACT

A vehicle cap construction comprises a rigid framework having interconnected frame sections which form both frames for the closures, such as the windows, hatches, etc., and the sole skeletal support for the cap. Two of the frame sections form base rails which are adapted for direct connection to the vehicle bed, and the closures are mounted directly in the closure frame without any intermediate framing.

17 Claims, 8 Drawing Figures

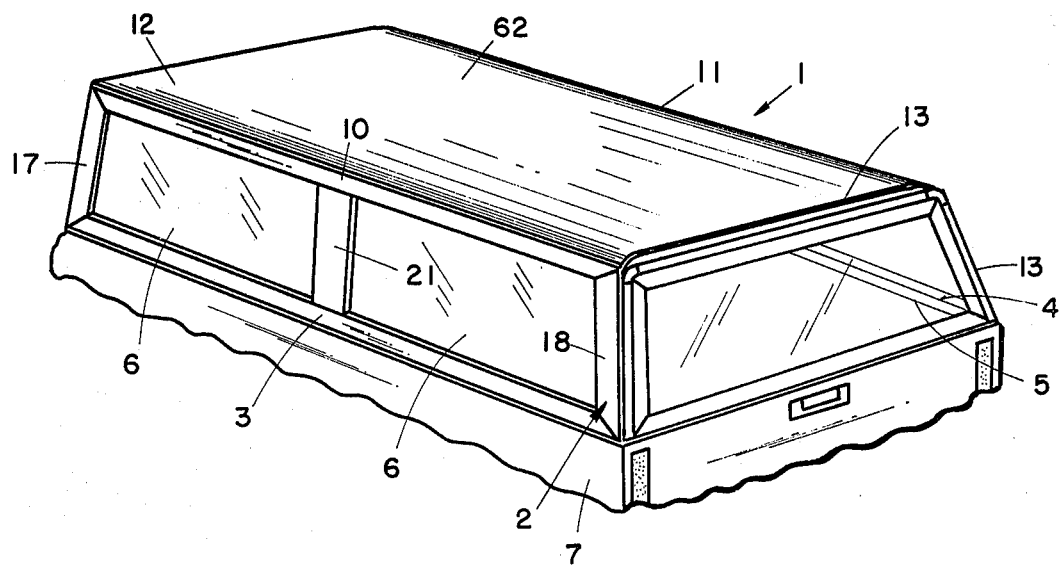
FIG I
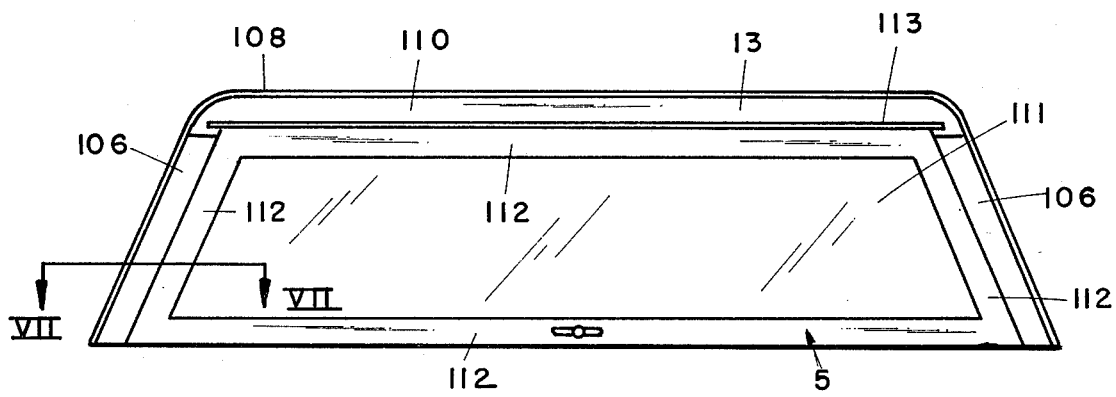
FIG 2

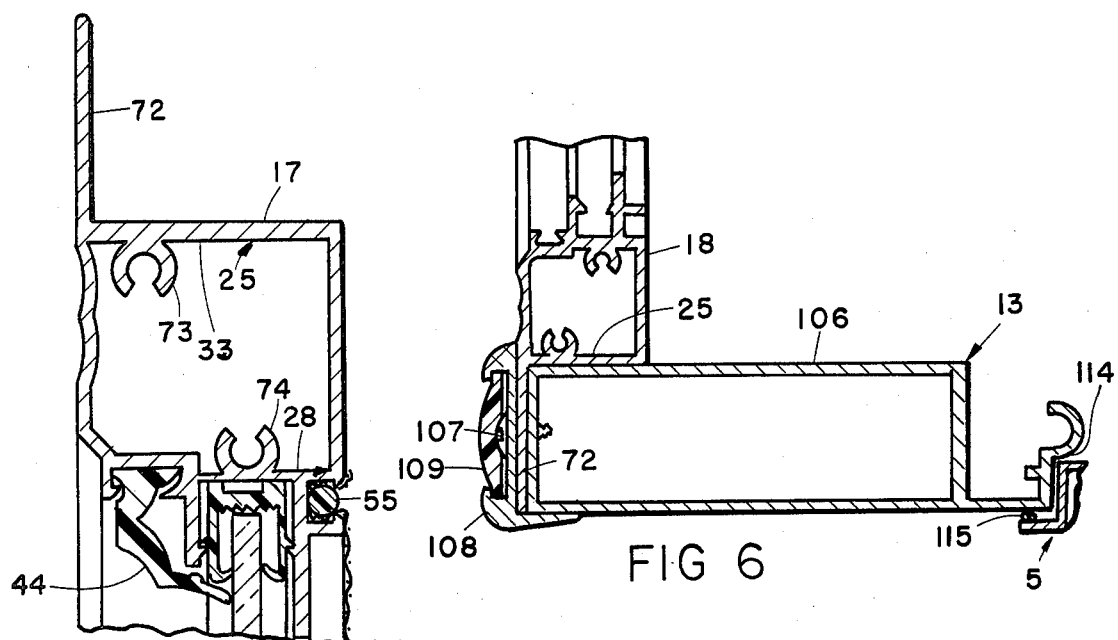
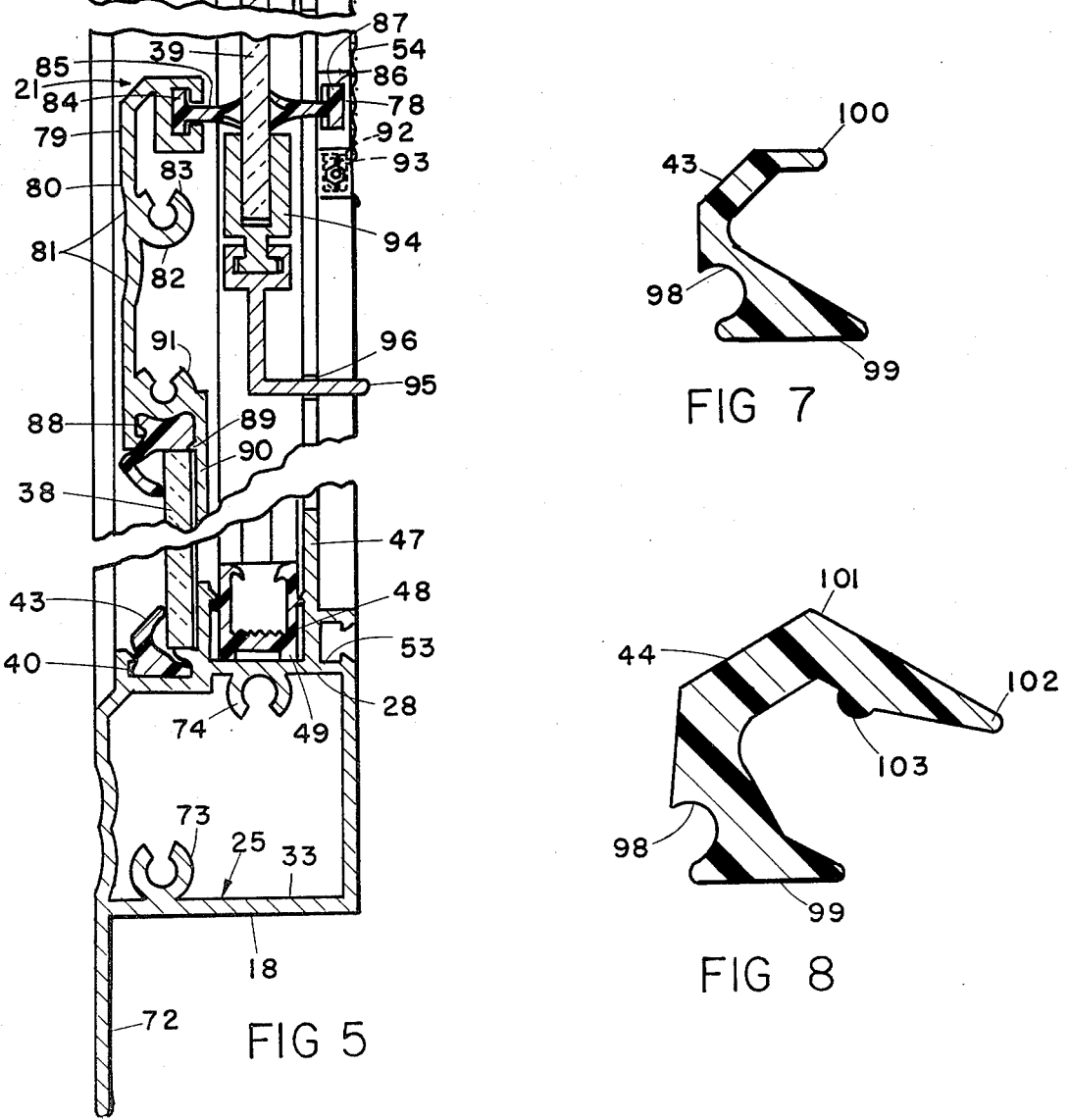
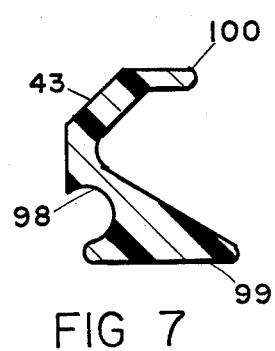
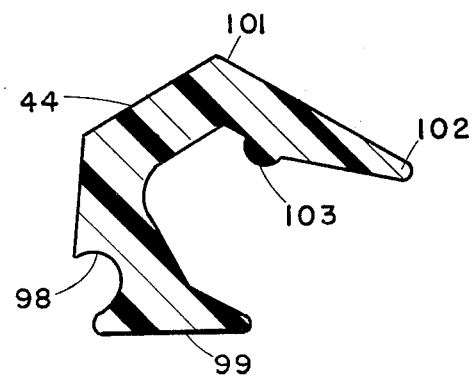

VEHICLE CAP CONSTRUCTION

CROSS REFERENCE TO RELATED APPLICATIONS

The present application is related to my copending U.S. patent application Ser. No. 209,581, filed Nov. 24, 1980, entitled HATCH FRAME FOR VEHICLE CAPS, which is hereby incorporated by reference.

BACKGROUND OF THE INVENTION

The present invention relates to vehicle caps, and the like, and in particular to a frame construction therefor.

Caps are used in conjunction with vehicles, such as pickup trucks, and the like, which have either a fully or partially open bed, or other similar open area, which is desired to be enclosed. Heretofore, aluminum vehicle caps have typically included a multiple piece assembly, such as that disclosed in the R & T Frames, Inc. publication entitled "CK-200 Package", noted in the Disclosure Statement. In these designs, four separate frame sections at the sides and ends of the cap are interconnected by fasteners to form a generally rectangular framework. Bowed ribs are attached between the two side frame sections to support the roof. The hatches, windows, and other closures in the cap are framed separately, and are in turn mounted in the framework by intermediate framing, comprising molding strips and screws. For example, the sides of prior caps generally include a welded tubular frame with vertical braces arranged therein to mount preframed windows. Both jalousie and stationary bubble windows are retained in the frame side sections by flat, intermediate framing members which are screwed to the main, skeletal framework of the vehicle cap. The cap is fastened to the vehicle by a pair of separate, L-shaped mounting rails which extend along the sides of the vehicle bed.

Another type of vehicle cap construction includes a one-piece, molded fiberglass body with apertures in which the closures are mounted. Although sliding windows have been used in this type of vehicle cap, the windows are prefabricated assemblies with a window pre-hung in an aluminum frame, having a flange which is screwed to the exterior of the fiberglass body. Such constructions are quite expensive, and cannot be easily varied for different shapes and designs due to the molded production technique.

SUMMARY OF THE INVENTION

One aspect of the present invention is to provide a vehicle cap construction, comprising a rigid framework having interconnected frame sections which form both at least one closure frame and the major skeletal support for the vehicle cap. Two of the frame sections form base rails which are adapted for direct connection with the supporting portions of the vehicle, and a modular weatherstripping bead arrangement mounts the closures directly in the closure framework without intermediate framing. The frame sections preferably include channels to receive stationary and sliding windows therein which are retained in place by the bead arrangement.

The principal objects of the present invention are to provide a construction for vehicle caps and the like which comprises a single framework in which the closures, such as hatches, doors, windows, and the like, are directly mounted without any intermediate framing. The cap framework is the major if not the sole structural frame or support for the cap, and is attached directly to the sides of the vehicle bed for very secure mounting. The framework forms a very strong and rigid, yet lightweight skeletal support for the cap, and is quite attractive. The side frames are preferably shaped to easily mount fixed and sliding windows with a retaining bead arrangement which reduces assembly time and cost, and facilitates repair. The cap construction minimizes the total number of separate parts in the assembly, to reduce material and assembly costs, and also forms a very strong, rattle-free, weathertight structure.

These and other features, advantages, and objects of the present invention will be further understood and appreciated by those skilled in the art by reference to the following written specification, claims and appended drawings.

BRIEF DESCRIPTION OF THE DRAWINGS

FIG. 1 is a perspective view of a vehicle cap construction embodying the present invention, shown connected with a vehicle.

FIG. 2 is a rear elevational view of the vehicle cap.

FIG. 5 is an enlarged, fragmentary, horizontal cross-sectional view of the vehicle cap, taken along the line V—V, FIG. 3.

FIG. 6 is a fragmentary, horizontal cross-sectional view of a rear, corner portion of the vehicle cap.

FIG. 7 is an enlarged, lateral cross-sectional view of a bead strip adapted for retaining a stationary window in the vehicle cap.

FIG. 8 is an enlarged, lateral cross-sectional view of a second bead strip, adapted for retaining a sliding window in the vehicle cap.

DETAILED DESCRIPTION OF THE PREFERRED EMBODIMENTS

Figure 3:
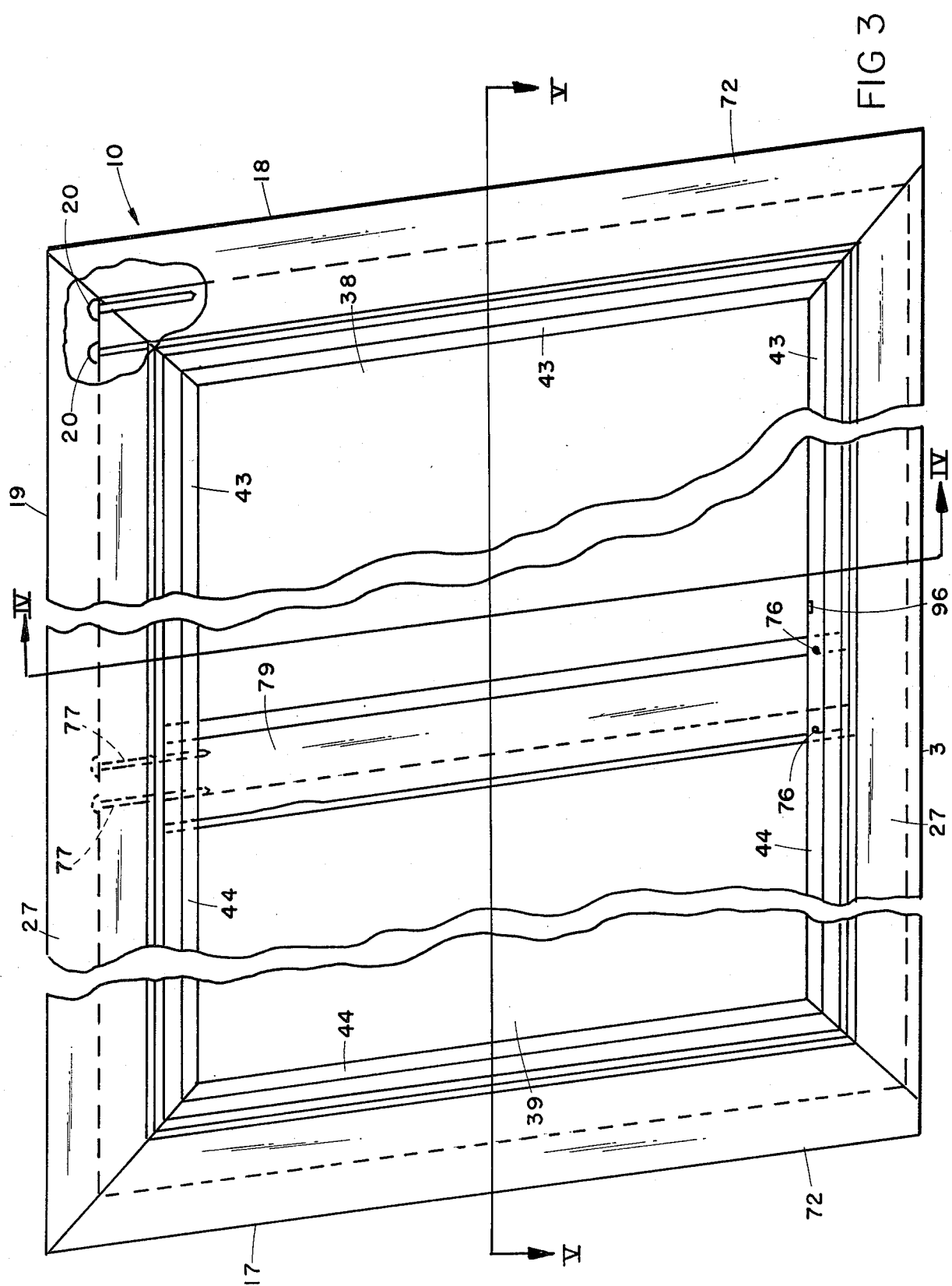
FIG. 3 is a fragmentary, elevational view of a side frame of the vehicle cap, with a portion thereof broken away to reveal internal construction.

For purposes of description herein, the terms "upper", "lower", "right", "left", "rear", "front", "vertical", "horizontal", and derivatives thereof shall relate to the invention as oriented in FIG. 1. However, it is to be understood that the invention may assume various alternative orientations, except where expressly specified to the contrary.

The reference numeral 1 (FIG. 1) generally designates a vehicle cap construction, comprising a rigid framework 2 having interconnected frame sections which form both frames for a hatch 5 and windows 6, and the major if not the sole skeletal support for the cap. Two of the frame sections 3 and 4 are base rails shaped for direct connection to the support portions of a vehicle bed 7, and hatch 5 and windows 6 are mounted directly in their associated frames without any intermediate framing. Rigid framework 2 includes left and right hand side frame sections 10 and 11 respectively and forward and rearward frame sections 12 and 13.

As best illustrated in FIG. 3, the side frame sections 10 and 11 each include end segments 17 and 18, upper segment 19 and base segment 3, which are interconnected at the corners of the side frames by fasteners 20, or other suitable means. In this example, frame segments 3 and 17–19 have mitered ends, and are interconnected in a parallelogram configuration which is inclined toward the forward portion of the vehicle cap. A mullion 21 divides the frame into left and right-hand segments, as described in greater detail hereinafter.

Figure 4:
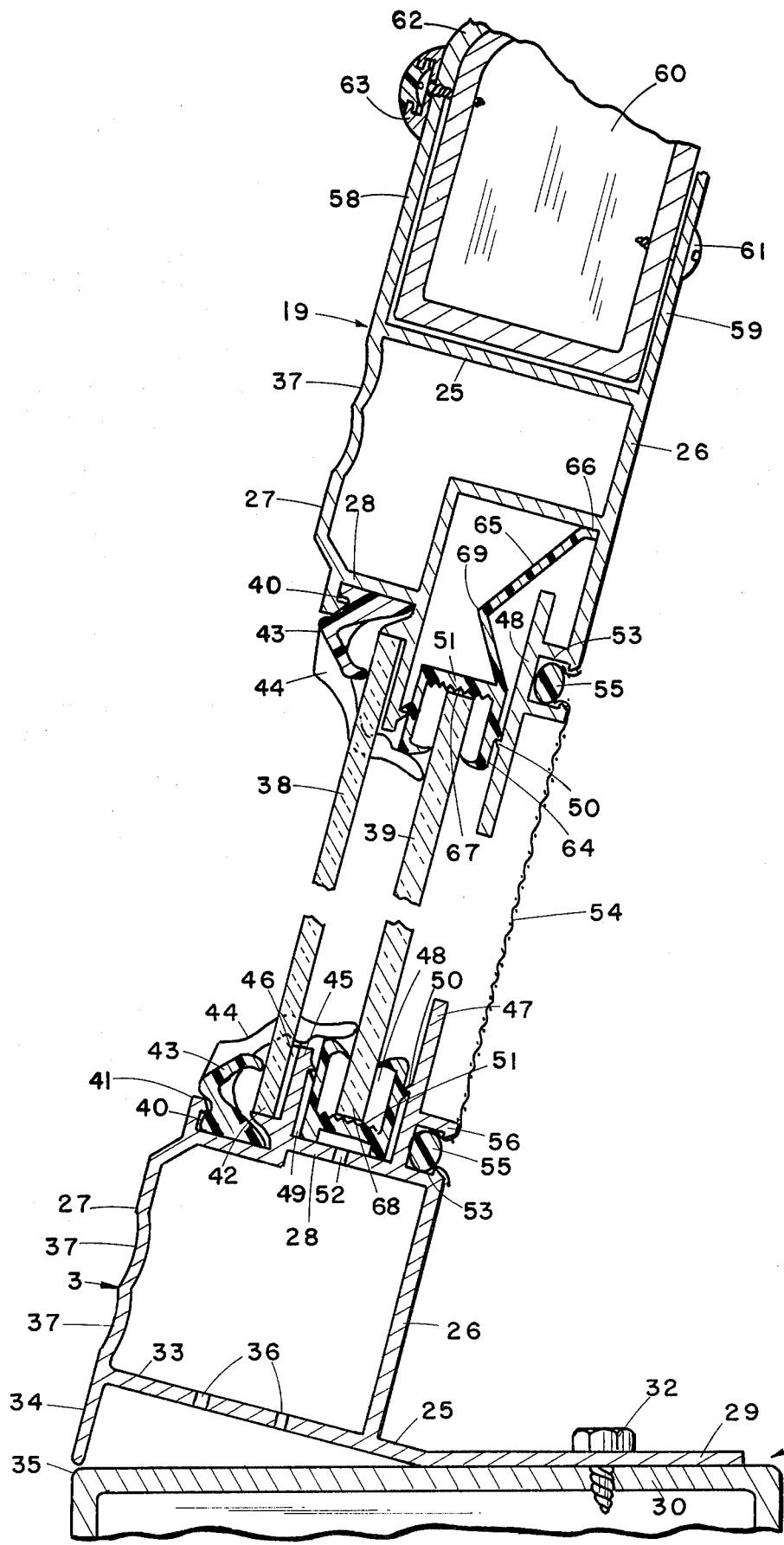
FIG. 4 is an enlarged, fragmentary, vertical cross-sectional view of the vehicle cap, taken along the line IV—IV, FIG. 3, shown attached to the vehicle.

With reference to FIG. 4, base frame segment 3 is of a generally tubular, extruded construction comprising base 25, interior and exterior walls 26 and 27, and an upper wall 28. Base 25 includes horizontal mounting plate 29, which is abuttingly supported on one of the side rails 30 of vehicle bed 7, and is securely attached thereto by suitable fasteners, such as screws 32. The bottom 33 of the channel portion of base 25 is inclined with respect to mounting plate 29 at an angle which corresponds to the desired angle of the vehicle cap sidewalls. In this example, the cap sidewalls angle inwardly at an angle in the nature of 15°. The lower end of exterior wall 27 extends below the outer end of channel bottom 33 to form a flange 34 which extends adjacent to the outer edge 35 of the vehicle side rail 30 to close off the area underneath the channel bottom 33 and present a neat appearance. Apertures 36 are provided in the bottom of frame wall 33 to drain any moisture which may collect in the channel. The illustrated exterior wall 27 includes two arcuately shaped, shallow, concave channels 37 which form a rib therebetween and improve the rigidity and appearance of the frame structure.

The frame upper wall 28 is provided with a series of channels and ledges which is adapted to mount both stationary and sliding window panes 38 and 39 respectively therein. A first channel 40 is provided along the exterior edge of upper wall 28 and has a shoe-shaped lateral cross section which includes an outer flange 41 and an inner lip 42. Channel 40 is adapted to receive and retain the base of two differently shaped retaining beads 43 and 44 therein, which hold windows 38 and 39 in the frame, as described in greater detail below. A wall 45 extends upwardly and perpendicularly from lip 42 to form an outwardly facing, L-shaped ledge in which the bottom edge of stationary window pane 38 is supported. A piece of flat weatherstripping 46 is placed between the interior side of window pane 38 and wall 45 to form a weathertight seal therebetween. Inwardly of wall 45, a second wall 47 extends upwardly and perpendicularly from upper wall 28, a spaced apart distance from wall 45, and forms a second channel 48 therebetween. A segment of U-shaped, self-lubricating molding 49 is positioned in channel 48 to form a track or guide, and is retained therein by a barb arrangement 50. The guide 49 is shaped to receive the lower edge of sliding window pane 39 therein. The upper flanges of guide 49 are oriented inwardly to a position adjacent the opposite sides of window pane 39, and the guide base 51 is ribbed to facilitate smooth sliding contact between the guide and the edge of the window panel. A weep hole or aperture 52 is positioned through the base of channel 48 to permit moisture to drain into the interior of the frame channel, and thence through apertures 36 to the exterior of the vehicle cap. Base frame segment 3 also includes a third, inwardly facing channel 53 along the interior side of wall 28, and receives the bottom edge of a screen or mesh panel 54 which is retained therein by an elliptically shaped segment of molding 55. Barbs 56 are provided on the ends of the flanges of channel 53 to securely retain the molding 55 and screen 54 in place.

The upper frame segment 19 (FIG. 4) has a channeled configuration which is generally similar to base frame segment 3. Hence, to facilitate description, corresponding parts are identified herein by the same reference numeral. The base 25 of upper frame segment 19 is U-shaped with upstanding flanges 58 and 59 shaped to receive a similarly formed side edge of roof braces 60 therein. Suitable means, such as fasteners 61, attach roof braces 60 to the side frame sections 10 and 11. A roof panel 62 overlies and is attached to braces 60, and a molding strip 63 covers the joint formed between the side edge of roof panel 62 and the upper edge of flange 58. The second channel 48 in the upper frame segment 19 is much deeper than the corresponding channel in the lower frame segment, and is adapted to slidingly mount a slightly different guide 64 therein, so that the sliding windows 39 can be easily installed and removed from the frame. The upper guide 64 is basically similar to the lower molding strip having a U-shape with flanges and base 51, but includes a resilient leg 65, in the nature of a leaf spring, extending from base 51, with a foot 66 on the free end which engages the base of the channel 47 and is captured in the corner of the channel. Spring 65 is preferably integrally molded with guide 64 from a resilient material, such as plastic or the like, and is shaped to apply downward pressure to the guide, thereby retaining the same against the barbs 50 in the channel sidewalls. Spring 65 has a bifurcated shape which flexes resiliently at joint 69. To install a window pane 39 in the frame, the user simply inserts the upper edge 67 of the glass panel into the upper guide 64, then pushes the glass panel and guide bodily upwardly into the channel thereby compressing spring 65. The glass panel 39 is moved upwardly into the frame until the bottom edge 68 of the glass panel can be swung inwardly into a position above the lower guide 49. The window panel is then inserted into the lower guide 49, and spring 65 resiliently urges the upper guide 64 against the upper edge of the glass panel, so that the window pane is securely, yet slideably mounted between the upper and lower guides in the side frame. The upper edge of screen 54 is mounted in channel 53 of the upper segment 19 by bead 55, and retains the screen in a taut condition across the interior of the sliding window opening.

With reference to FIG. 5, the end frame segments 17 and 18 have a channeled lateral cross-sectional shape which is similar to base segment 3. Corresponding parts are therefore designated by the same reference numeral for ease of description. The base 25 of end frame segments 17 and 18 include a flange 72 extending outwardly and perpendicularly from the exterior edge of the frame segment. As best shown in FIG. 6, flange 72 is attached to the upstanding members 106 of rear frame section 13 by fasteners 107, and a molding strip 108 with flexible insert 109 covers the fastener heads. On the interior of the frame channel, arcuately shaped fastener sleeves 73 and 74 (FIG. 5) extend from the bottom 33 and top 28 of the tubular channel, for purposes to be described in greater detail hereinafter. The channels 40, 48 and 53 are identical with those discussed above in conjunction with the base 3, and respectively receive window retaining beads 43 and 44, guides 49 and screen bead 55 therein.

Rear frame section 13 (FIG. 2) is substantially identical with that described in my above-referenced, co-pending patent application entitled HATCH FRAME FOR VEHICLE CAPS, and includes a pair of upstanding side segments 106, and an upper segment 110 which are interconnected to form an inverted, generally U-shaped frame for hatch 5. In this example, hatch 5 comprises a glass panel 111, with four rigid interconnected frame members 112 extending about the margin thereof. Upper hatch frame segment 110 includes an inverted U-shaped hinge member 113 disposed along the lower edge thereof which mates with a hinge member on the upper hatch frame 112 to pivotally suspend hatch 5 from the hatch frame 13. A recess 114 (FIG. 6) extends along the inner edges of side frame segments 106, and includes a seal 115 to abut hatch 5.

The mullion 21 (FIG. 5) includes interior and exterior members 78 and 79 which extend vertically between the upper and lower frame segments 19 and 3 at a medial portion of the frame. Mullion members 78 and 79 are connected with base frame segment 3 by means such as laterally oriented pop rivets 76 (FIG. 3) which extend through the exterior face of the channel. Vertically extending screws 77 attach the upper end of mullion member 78 with upper frame segment 19. Exterior mullion segment 79 (FIG. 5) includes a side plate 80 with a pair of concave ridges 81 which match the ridges 37 in the other frame segments. An arcuately shaped fastener sleeve 82 extends along the interior of plate 80 opposite ridges 81. The forward end of exterior mullion 79 includes an inwardly facing, C-shaped channel 83 having the base portion 84 of a wiper blade 85 mounted therein. The flexible ends of wiper blade 85 abut the exterior side of sliding glass panel 39 and squeegee the same as the window pane 39 slides past the wiper blade. The interior mullion 78 has a corresponding channel 86 and wiper blade 87 mounted therein, such that both sides of glass panel 38 are wiped as the window is slid thereby. The rearward end of the exterior mullion member 79 includes a channel 88 substantially similar in shape to the molding channel 40, with lip 89 and wall 90 which form a ledge on which the side edge of stationary window pane 38 is supported. A second fastener sleeve 91 is positioned on the inner side of channel 88, and fasteners 77 (FIG. 3) are anchored in mullion sleeves 82 and 91 (FIG. 5) to fasten the exterior mullion member with upper frame segment 19.

The interior mullion segment 78 includes a second channel 92 which is adapted to receive the interior side edge of screen 54 therein and mount the same in the channel with bead 93. The interior end edge of sliding window pane 39 includes a U-shaped channel 94 extending therealong with a handle segment 95 attached thereto for facilitating grasping the window 38 and sliding the same longitudinally along the channels. A notch 96 is provided in wall 47 of the lower frame segments 3 and 4 at a location adjacent mullion 79, and is shaped to receive the lower edge of handle 95 therein to lock the sliding window in the closed position. All of the structural parts of the frame 2 are preferably constructed from segments of extruded aluminum channel.

The window retaining beads or trim members 43 and 44 are shown in greater detail in FIGS. 7 and 8 respectively and include resilient bodies with an arcuately shaped, cut-out 98, forming a foot-shaped base 99 which is matingly received into any one of the channels 40. The base of both beads 43 and 44 is substantially identical in shape, such that either bead can be easily secured in any channel 40. The upper body portion of bead 43 is finger-shaped, with an inwardly extending free end 100 adapted to abut the exterior surface of stationary glass panel 38 and resliently push the glass panel inwardly and securely retain the same in ledge 42. The upper portion of bead 44 is somewhat similar to that of bead 43, but has a longer arm portion 101 so that the free end 102 extends inwardly further from the base to engage the sliding widow panel 39 and retain the same in guides 49 and 64. A semi-circular projection 103 extends along the undersurface of the arm 101 to retain the arm free end in position with respect to the frame. The retaining beads 43 and 44 are preferably constructed of a relatively soft vinyl, in the nature of 80 durometer.

In use, four segments of fixed window bead 43 are cut to length for positioning in the channels 40 surrounding stationary window pane 38. The free edges of the bead segments abut window pane 38 and fixedly retain the same in place. Three segments of sliding window bead 44 are cut to length and installed in channel 40 at the top, bottom and end of the associated sliding window opening. The bead segments 44, in conjunction with the wipers 85 and 87 retain the sliding window pane 39 in the frame channel and form a seal when the window is closed. To open the sliding window, the user simply grasps handle 95 and pulls the window longitudinally toward the rear of the vehicle cap.

The framework 2 provides a construction in which the closures are directly mounted without any intermediate framing, thereby reducing material cost and assembly time. The cap framework 2 is at least the major, if not the sole structural frame or support for the cap and provides a very rigid structure which can be attached directly to the sides of the vehicle bed for secure mounting. The framework includes a minimum of separate parts and fasteners to provide a relatively rattle-free and lightweight cap. The side frame channels provide a modular mounting arrangement for both the fixed and sliding windows, which reduces assembly and repair difficulty and provides a weathertight seal.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The embodiments of the invention in which an exclusive property or privilege is claimed are defined as follows:

1. In a vehicle cap construction and the like, the improvement comprising:
   a rigid framework having interconnected front, rear and opposing side frame sections; one of said frame sections defining both at least one closure frame and at least a major skeletal support for said vehicle cap;
   said opposing side frame sections including base rails which are adapted for direct connection with a support bed of a vehicle;
   a closure received wholly within the closure frame portion of said one frame section; and
   means for mounting said closure directly in said closure frame without any intermediate framing; said mounting means comprising a ledge formed integrally in said closure frame, and extending about the interior perimeter of said closure frame to receive said closure therein, a channel formed integrally in said closure frame, and positioned exterior of said ledge, and an elongated bead having a base portion thereof mounted in said channel and a resilient free edge abutting said closure to securely retain said closure in said closure frame.

2. A vehicle cap as set forth in claim 1, wherein:
   said one frame section comprises a first side frame section;

said first side frame section further includes a second channel disposed interior to said ledge;

a second closure is slidingly received in said second channel;

said bead fixedly retains said first named closure in said ledge to form a stationary panel; and including a second elongate bead having a base portion thereof mounted in said first named channel, and a resilient free edge abutting said second named closure and retaining the same in said second channel to form a sliding panel.

3. A vehicle cap as set forth in claim 2, wherein:

said first side frame section includes upper and lower segments, and front and rear end segments; and including first and second self-lubricating, U-shaped guides extending along said upper and lower frame segments, respectively, disposed in said second channel thereof, and enveloping associated side edges of said second closure to facilitate sliding.

4. A vehicle cap as set forth in claim 3, wherein:

the second channel at said upper frame segment is deeper than said first guide segment, whereby said first guide is retractable upwardly into said second channel for installing said second closure into said closure frame.

5. A vehicle cap as set forth in claim 4, wherein:

said first guide includes a leaf spring resiliently urging the same outwardly of the second channel in said upper frame segment.

6. A vehicle cap as set forth in claim 5, wherein:

said first side frame section includes a mullion connected between the upper and lower segments of said first side frame section at a medial portion thereof, and retaining an end edge of said first closure therein.

7. A vehicle cap as set forth in claim 6, wherein:

said mullion includes a wiper mounted therein which squeegees the outer surface of said second closure as said second closure slides past said mullion.

8. A vehicle cap as set forth in claim 7, wherein:

said frame sections include a rear section with an inverted U-shape hinge member disposed along an upper segment thereof; and including a hatch comprising a panel with interconnected, rigid frame segments extending about the margin thereof; an upper one of said frame segments having a hinge member thereon to mate with said first named hinge member and pivotally suspend said hatch from said framwork.

9. A vehicle cap as set forth in claim 8, wherein:

said rear frame section includes a recess extending about the inner edge thereof on the exterior side of said cap to receive said hatch therein and form a seal therebetween.

10. A vehicle cap as set forth in claim 9, wherein:

said first closure comprises a glass panel, and defines a stationary window pane.

11. A vehicle cap as set forth in claim 10, wherein:

said second closure comprises a glass panel, and defines a sliding window pane.

12. A vehicle cap as set forth in claim 1, wherein:

one of said side frame sections includes a mullion connected between upper and lower segments of said frame at a medial portion thereof, and retains an end edge of said closure therein.

13. A vehicle cap as set forth in claim 12, including:

means for slidably mounting said closure in said channel.

14. A vehicle cap as set forth in claim 13, wherein:

said mullion includes a wiper mounted therein which squeegees the outer surface of said closure as said closure slides past said mullion.

15. A vehicle cap as set forth in claim 1, wherein:

said rear frame section includes an inverted, U-shaped hinge member disposed along an upper segment thereof; and including a hatch comprising a panel with interconnected, rigid frame segments extending about the margin thereof; an upper one of said frame segments having a hinge member thereon to mate with said first named hinge member and pivotally suspend said hatch from said framework.

16. A vehicle cap as set forth in claim 15, wherein:

said rear frame section includes a recess extending about the inner edge thereof on the exterior side of said cap to receive said hatch therein and form a seal therebetween.

17. A vehicle cap as set forth in claim 1, wherein:

said closure comprises a glass panel.

* * * * *